No. 749,863. PATENTED JAN. 19, 1904.
H. A. HOUSEMAN.
BELT SHIFTING MECHANISM.
APPLICATION FILED JULY 17, 1903.
NO MODEL.

WITNESSES:
M. M. Hamilton
M. H. Ellis

INVENTOR
Harry A. Houseman
BY
Harding & Harding
ATTORNEYS

No. 749,863. Patented January 19, 1904.

UNITED STATES PATENT OFFICE.

HARRY A. HOUSEMAN, OF PHILADELPHIA, PENNSYLVANIA, ASSIGNOR TO STANDARD MACHINE COMPANY, OF PHILADELPHIA, PENNSYLVANIA, A CORPORATION OF PENNSYLVANIA.

BELT-SHIFTING MECHANISM.

SPECIFICATION forming part of Letters Patent No. 749,863, dated January 19, 1904.

Original application filed June 4, 1903, Serial No. 159,996. Divided and this application filed July 17, 1903. Serial No. 165,972.

(No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Belt-Shifting Mechanism, of which the following is a full, clear, and exact description, reference being had to the accompanying drawings, which form a part of this specification.

I will first describe the embodiment of my invention as illustrated in the accompanying drawings and then specifically point out the invention in the claims.

Figure 1:
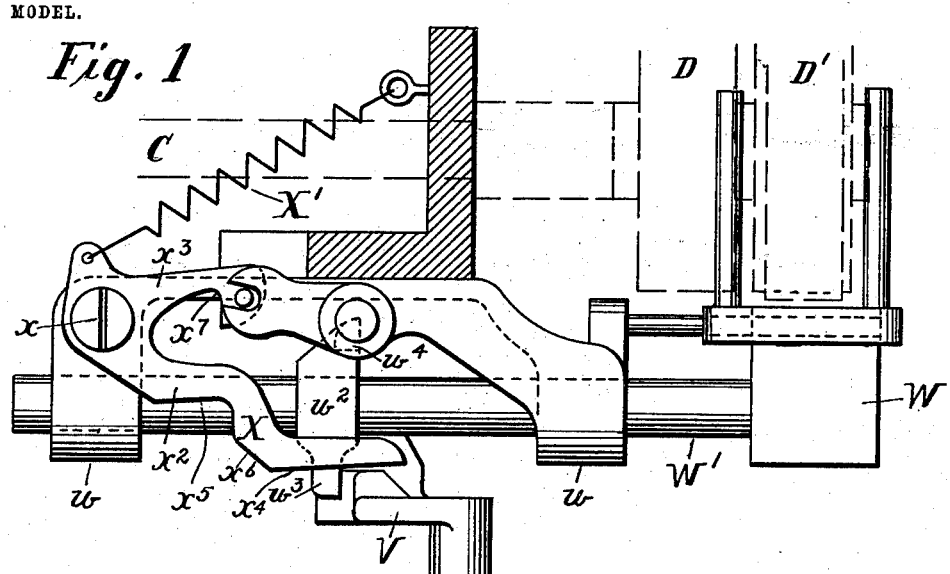
Figure 2:
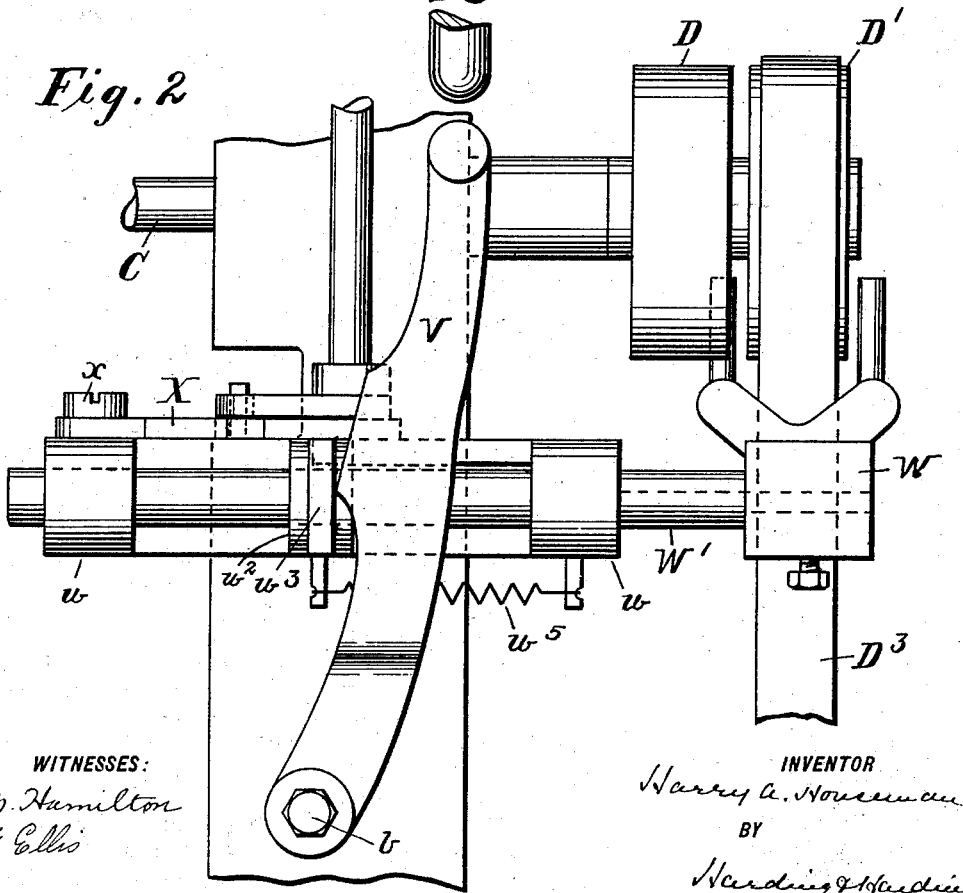

In the drawings, Figure 1 is an enlarged detail plan view. Fig. 2 is an elevation of same.

C is the driving-shaft, upon which are the fixed pulley D and the idle pulley D', and $D^2$ is the driving-belt.

W is the belt-shifting fork, between which is the belt $D^2$. This shifting-fork W is connected to the rod W', mounted in bearings $w\ w$, so as to slide laterally. By sliding this rod W' the belt may be shifted from the idle pulley D' to the active pulley D, and vice versa. Fixed upon this rod W' is the flange $w^2$, having at one side the projecting portion $w^3$ and at the other the projecting portion $w^4$. To this flange is also connected one end of a spring $w^5$, the other end being connected to a fixed point, said spring tending to hold the rod in such position as will hold the belt upon the loose pulley. The projection $w^3$ is in line of movement of a lever V, pivoted at $v$.

X is a plate pivoted at $x$ and acted upon by the spring X'. This plate X has the arms $x^2$ and $x^3$, the arm $x^2$ having the outward portion $x^4$ and the inward portion $x^5$ connected by the incline portion $x^6$. The action of the spring X' tends to hold the arm $x^2$ against the lever V. The arm $x^3$ has a notched portion $x^7$.

When the parts are in the position shown in Fig. 1, with the belt upon the loose pulley, and the lever V moved, it will through the flange $w^2$ move the rod W'. When the lever has passed beyond the portion $x^4$, the projecting portion $w^4$ has passed beyond the notched portion $x^7$ and the spring X' moves the plate X so that the notched portion $x^3$ will move behind the projecting portion $w^4$, holding the rod W' from movement. By moving the lever V in the opposite direction sufficient to move the notched portion $x^7$ from behind the projection $w^4$ the spring $w^5$ will return the rod to its initial position and the belt to the idle pulley. It is quite evident that the projection $w^4$ can be released from the notched portion $x^2$ and the machine automatically stopped by any appropriate mechanism.

The belt-shifting mechanism hereinbefore described has been used by me in connection with a circular-knitting machine such as is illustrated and described in an application filed by me June 4, 1903, Serial No. 159,996, of which this application is a division, although I do not intend to limit myself to such use.

Having now fully described my invention, what I claim, and desire to protect by Letters Patent, is—

1. The combination, with an idle pulley and a driving-pulley and a belt, of a shifter-fork adapted to move the belt from the idle to the driving pulley, a movable belt-shifter rod, a spring tending to hold said belt upon one of the pulleys, a projection from said rod, a pivoted plate having a notch, a spring tending to move said plate toward said rod and means to hold said plate away from said rod until said projection has passed beyond the notch.

2. The combination, with an idle pulley and a driving-pulley and a belt, of a shifter-fork adapted to move the belt from the idle to the driving pulley, a movable belt-shifter rod, a spring tending to hold said belt upon one of the pulleys, a projection from said rod, a pivoted plate having a notch, a spring tending to move said plate toward said rod, a lever for moving said rod, said spring holding said plate toward said lever, there being an inwardly-inclined portion on said plate, said lever reaching said inwardly-inclined portion when the projection has passed beyond the notch.

3. As a locking and releasing device for a spring-actuated shifter-fork having a projection, the combination of a pivoted plate having a notch, a spring acting upon said plate, there being means to hold the plate against the action of the spring until the projection has passed beyond the notch.

4. As a locking and releasing device for a spring-actuated shifter-fork having a projection, the combination of a pivoted plate having a notch, a spring action upon said plate there being means to hold the plate against the action of the spring until the projection has passed beyond the notch, there being means to move the said plate to release said lever.

5. As a locking and releasing device for a spring-actuated shifter-fork, having a projection, the combination of a pivoted plate having two arms, one of which has a notch, a lever operatively connected with said belt-shifter, against which the other arm rests, a spring tending to hold the arm in contact with the lever, said arm having an inwardly-inclined portion forming a means to allow the plate to lock the shifter and release the plate from the lever.

In testimony of which invention I have hereunto set my hand at Philadelphia on this 15th day of July, 1903.

HARRY A. HOUSEMAN.

Witnesses:
M. F. ELLIS,
M. M. HAMILTON.